US008629684B2

(12) United States Patent
Deschildre et al.

(10) Patent No.: US 8,629,684 B2
(45) Date of Patent: Jan. 14, 2014

(54) ELECTRONIC CIRCUIT WITH A CAPACITIVE SENSOR FOR MEASURING A PHYSICAL PARAMETER AND METHOD OF ACTIVATING THE ELECTRONIC CIRCUIT

(75) Inventors: Alexandre Deschildre, Marin (CH); Sylvain Grosjean, Les Fins (FR); Michel Willemin, Preles (CH)

(73) Assignee: EM Microelectronic-Marin SA, Marin (CH)

( * ) Notice: Subject to any disclaimer, the term of this patent is extended or adjusted under 35 U.S.C. 154(b) by 975 days.

(21) Appl. No.: 12/720,764

(22) Filed: Mar. 10, 2010

(65) Prior Publication Data

US 2010/0231237 A1    Sep. 16, 2010

(30) Foreign Application Priority Data

Mar. 10, 2009    (EP) .................................... 09154775

(51) Int. Cl.
*G01R 27/26*    (2006.01)

(52) U.S. Cl.
USPC ........... 324/661; 324/663; 324/665; 324/672; 324/679; 73/862; 73/55

(58) Field of Classification Search
USPC .................... 324/661, 663, 665, 672, 679; 73/862.192, 862.55
See application file for complete search history.

(56) References Cited

U.S. PATENT DOCUMENTS

| | | | |
|---|---|---|---|
| 4,090,408 A * | 5/1978 | Hedrick | 73/304 C |
| 4,387,601 A | 6/1983 | Azegami | |
| 5,451,940 A | 9/1995 | Schneider et al. | |
| 5,582,245 A | 12/1996 | Niimi et al. | |
| 7,532,016 B2 * | 5/2009 | Grosjean et al. | 324/661 |
| 7,724,000 B2 * | 5/2010 | Grosjean et al. | 324/661 |
| 7,845,224 B2 * | 12/2010 | Barlesi et al. | 73/304 C |

(Continued)

FOREIGN PATENT DOCUMENTS

| | | |
|---|---|---|
| DE | 39 42 159 A1 | 6/1991 |
| EP | 0 723 166 A | 7/1996 |
| EP | 1 835 263 A | 9/2007 |

(Continued)

OTHER PUBLICATIONS

H. Leuthold and F. Rudolph, "An ASIC for High-Resolution Capacitive Microaccelerometers," Sensors and actuators A21-23 (1990), pp. 278 to 281.
European Search Report issued in corresponding application No. EP09154775, completed Sep. 23, 2009.

*Primary Examiner* — Jermele M Hollington
*Assistant Examiner* — Temilade S Rhodes-Vivour
(74) *Attorney, Agent, or Firm* — Griffin & Szipl, P.C.

(57) ABSTRACT

The electronic circuit has a capacitive sensor that includes two capacitors mounted in differential, whose common electrode can move relative to each fixed electrode of the two capacitors to alter the capacitive value of each capacitor. The electronic circuit has an interface connected to the capacitive sensor, which includes a charge transfer amplifier unit connected to the common electrode, an integrator unit, and an excitation unit arranged between the output of the first integrator unit and the sensor to polarise each fixed electrode of the sensor capacitors at a determined voltage value. A compensation capacitor is connected to the input of the integrator unit. The electronic circuit interface includes comparison means for comparing the output voltage with a comparison voltage to control disconnection of the compensation capacitor at the integrator unit input, if the deviation between the output voltage and the comparison voltage exceeds a determined voltage threshold.

11 Claims, 7 Drawing Sheets

(56) References Cited

U.S. PATENT DOCUMENTS

| | | | |
|---|---|---|---|
| 2004/0232922 A1* | 11/2004 | Eberlein | 324/679 |
| 2007/0216423 A1* | 9/2007 | Grosjean et al. | 324/661 |
| 2008/0197861 A1* | 8/2008 | Grosjean et al. | 324/661 |
| 2009/0184723 A1* | 7/2009 | Shikata | 324/661 |
| 2010/0231237 A1* | 9/2010 | Deschildre et al. | 324/661 |

FOREIGN PATENT DOCUMENTS

| | | |
|---|---|---|
| FR | 2 486 232 A | 1/1982 |
| FR | 2 720 150 | 11/1995 |

\* cited by examiner

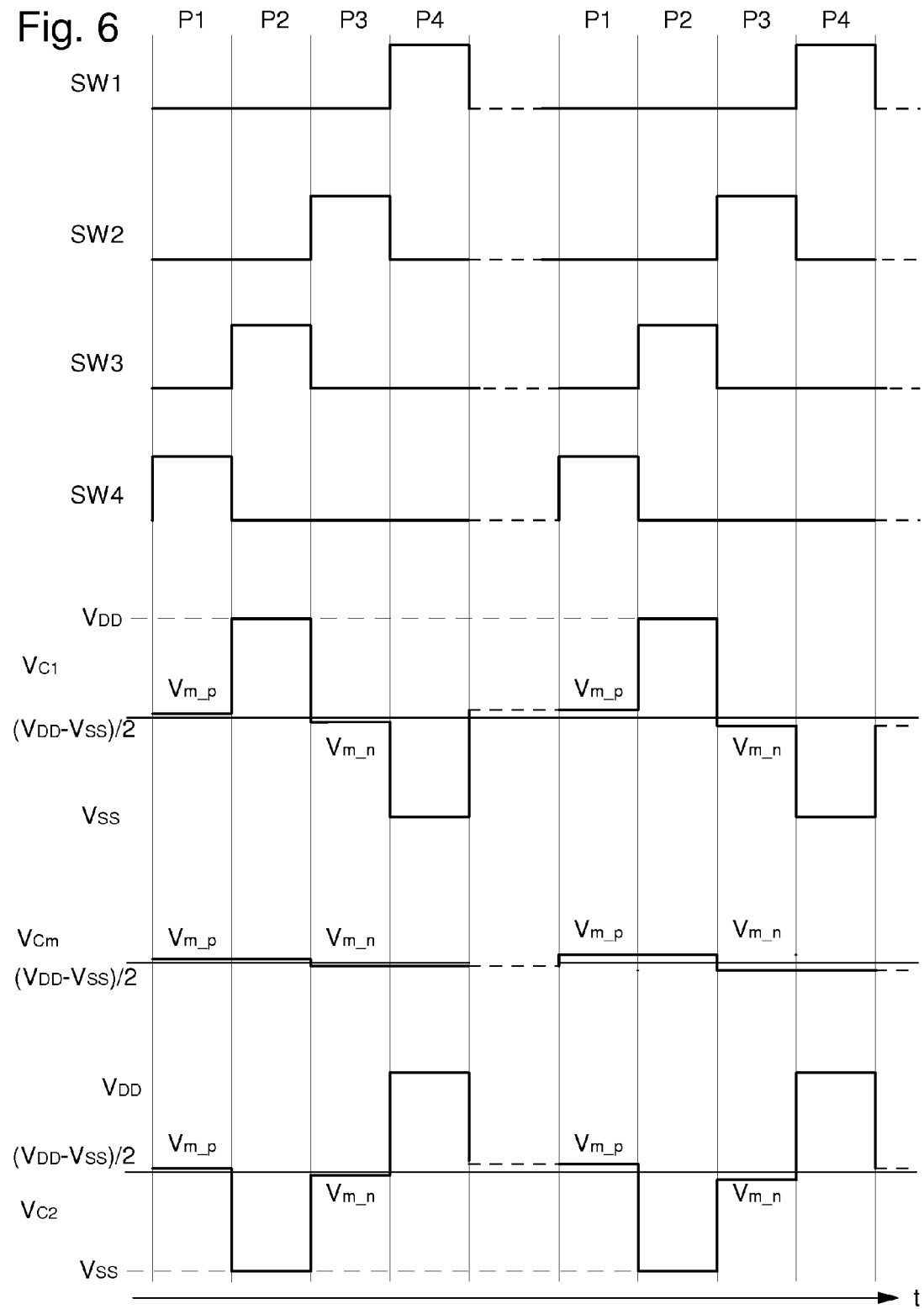

US 8,629,684 B2

ELECTRONIC CIRCUIT WITH A CAPACITIVE SENSOR FOR MEASURING A PHYSICAL PARAMETER AND METHOD OF ACTIVATING THE ELECTRONIC CIRCUIT

This application claims priority from European Patent Application No. 09154775.2 filed Mar. 10, 2009, the entire disclosure of which is incorporated herein by reference.

FIELD OF THE INVENTION

The invention concerns an electronic circuit with a capacitive sensor for measuring a physical parameter, such as an acceleration, angular velocity, force or pressure. The capacitive sensor comprises two capacitors mounted in differential whose common electrode is able to move between two fixed electrodes via the action, for example, of a force, to alter the capacitive value of each capacitor.

The invention also concerns a method of activating the electronic circuit.

BACKGROUND OF THE INVENTION

Usually, in such capacitive sensors for measuring a physical parameter, the mobile common electrode forms part of an armature resiliently held between the two fixed electrodes. This common electrode is capable of moving a certain distance in the direction of one or the other of the fixed electrodes, via the action of a force, for example. In the inoperative state, the common electrode is ideally equidistant from both fixed electrodes, which defines equal capacitive values for the two capacitors. When the common electrode moves via the action, for example, of a force, the capacitive value of each capacitor varies inversely. An interface connected to the electronic circuit capacitive sensor is for providing an output signal in the form of a voltage that depends upon the variation in the capacitances of the capacitors.

In an ideal case, the output voltage varies in a linear manner in relation to the movement of the mobile common electrode. However, since the electronic circuit parts are made in the form of at least one integrated circuit in a semiconductor substrate, stray capacitances, which are added to the capacitor capacitances, must be taken into account. These stray capacitances are virtually independent of the movement of the common electrode, which creates non-linearities. Consequently, the electronic circuit output voltage does not vary linearly in relation to the movement of the mobile common electrode. These stray capacitors also have the effect of lowering the sensitivity or yield of the electronic circuit.

Since the MEMS type sensor can also be integrated in a semiconductor substrate, such as a silicon substrate, there is also a problem of non-linearity also linked to the potential of the substrate during operation of the sensor. The substrate potential is difficult to control across the entire structure of said sensor, since the substrate is never totally conductive. Because of this non-linearity, the measured electrostatic force is not zero when the electronic circuit is in inoperative mode. The influence of the substrate potential on the electrostatic force leads to a variation in the measured real force, which is applied across the moving common electrode, which is a drawback of the electronic circuit. Moreover, stray capacitors in parallel with the sensor's capacitors must also be taken into account. The capacitances of the stray capacitors are assumed to be quasi-constant and independent of the force applied to the electronic circuit. This has the effect of decreasing the sensitivity or yield of the electronic circuit, which is another drawback of the electronic circuit with a capacitive sensor.

In order, generally, to take a force, acceleration or pressure measurement, the fixed electrodes of the two capacitors are biased or excited cyclically by voltages of opposite polarity relative to an inoperative reference voltage. By biasing or polarising the two fixed electrodes at different voltage levels, the charge difference across the moving electrode can be measured and converted into an electronic circuit output voltage. When the output voltage has stabilised at its final value, the total charge across the moving electrode becomes zero. This output voltage can be supplied, sampled, to a processing circuit able to provide acceleration, force, pressure or angular velocity data, depending upon the structure of the sensor.

An electronic circuit with a capacitive sensor of the prior art is shown in FIG. 1, and the activation thereof is illustrated by a time diagram of various voltage signals in FIG. 2. The electronic circuit shown is based on an electronic circuit described in the article by Messrs. H Leuthold and F. Rudolph, which appeared in the journal entitled, "Sensors and actuators" A21-23 (1990), pages 278 to 281.

The electronic circuit 1 shown includes an interface connected to a capacitive sensor 2, which includes two capacitors mounted in differential C1 and C2. The two capacitors have a common electrode Cm that can move between two fixed electrodes. The interface of electronic circuit 1 includes a charge transfer amplifier unit 4, which is connected at input to common electrode Cm, an integrator unit 5 for permanently supplying at output a voltage Vm equal to the integral of charges supplied by amplifier unit 4, and an excitation unit 3 for cyclically biasing or polarizing the fixed electrodes at determined voltage levels.

Excitation unit 3 includes four switches 12, 13, 14 and 15, which can be formed by MOS switching transistors in the integrated circuit. The first switch 12 is arranged between the output of integrator unit 5 and the fixed electrode of capacitor C1. The second switch 13 is arranged between the integrator unit output and the fixed electrode of capacitor C2. The third switch 14 is arranged between the high voltage terminal $V_{DD}$ of a continuous voltage source and the fixed electrode of capacitor C1. Finally, the fourth switch 15 is arranged between the low voltage terminal $V_{SS}$ of the voltage source and the fixed electrode of capacitor C2.

In the electronic circuit operating mode, each successive measuring period or cycle is divided into two phases P1 and P2 as shown in FIG. 2. The change from one phase to another is controlled by clock signals that are not shown, for respectively opening or closing the switches. Switches 12 and 13 are closed by signals SW2 at the "1" state in the first phase designated P1 in FIGS. 1 and 2, whereas switches 14 and 15 are open in this first phase P1. In this first phase P1, voltage Vm present at the integrator unit output is applied to each electrode of the sensor to discharge the two capacitors completely as shown by voltage diagrams $V_{C1}$, $V_{Cm}$ and $V_{C2}$.

Switches 14 and 15 are closed by signals SW1 at the "1" state in the second phase designated P2, whereas switches 12 and 13 are open. In this second phase P2, voltage $V_{DD}$ is applied to the fixed electrode C1 seen in the $V_{C1}$ diagram, whereas voltage $V_{SS}$ is applied to the fixed electrode C2 seen in the $V_{C2}$ diagram. If the moving electrode is moved a certain distance in the direction of one or other of the fixed electrodes, the capacitances of the capacitors will vary inversely. This will lead to a difference in the charges accumulated by each capacitor, which also depends upon the voltage Vm previously applied to each electrode of the capacitors.

The final value of voltage Vm at the integrator unit output is obtained after several operating cycles of the electronic circuit as a function of the movement of the mobile electrode between the two fixed electrodes as shown in the $V_{Cm}$ voltage diagram. In this case, the common electrode is moved in the direction of the fixed electrode of capacitor C1, which results in a final integrator unit output voltage, which is above the medium or intermediate voltage $(V_{DD}-V_{SS})/2$. The potential of the common electrode has thus been adjusted to cancel out any charge flow and thus to maintain the total charge at zero in accordance with the principle of charge compensation.

For the operation of transferring charges accumulated by common electrode Cm, the charge transfer amplifier unit 4 includes an operational amplifier 10, three capacitors C3, C4 and C5 and two switches 16 and 17. The inverter input of this amplifier is connected to common electrode Cm. Capacitor C3 in parallel with switch 16 is connected between the inverter input and the output of amplifier 10. Capacitor C4 is connected between the output of amplifier 10 and the input of integrator unit 5. Capacitor C5 is connected between the non-inverter input and a reference voltage terminal Vref, which can be defined as earth DC equal to $V_{SS}$ or $(V_{DD}-V_{SS})/2$ or to another potential. Finally, switch 17 is arranged between the output of integrator unit 5 and the non-inverter input of amplifier 10.

In the electronic circuit operating mode, the two switches 16 and 17 are closed by signals SW2 at the "1" state in first phase P1 to partly discharge capacitor C3 and polarise capacitor C5 with output voltage Vm at the non-inverter input of the amplifier. Voltage level Vm of capacitor C5 is maintained during second phase P2.

Integrator unit 5, which follows the charge transfer amplifier unit 4, includes two input switches 18 and 19, an operational amplifier 11 and an integration capacitor Cf. This capacitor Cf is connected between the inverter input and the output of amplifier 11, which supplies output voltage Vm of integrator 5. Input switch 18 is arranged between the output terminal of capacitor C4 of charge transfer unit 4 and the non-inverter input of amplifier 11. The potential of this non-inverter input of amplifier 11 is set at reference voltage Vref. Switch 19 is arranged between the output terminal of capacitor C4 of charge transfer unit 4 and the inverter input of amplifier 11.

In the electronic circuit operating mode, switch 18 is closed by signals SW2 at the "1" state in first phase P1 so that the voltage at the terminals of capacitor C4 of the charge transfer unit is equal to Vm if reference voltage Vref is at earth. Switch 19 is closed by signals SW1 at the "1" state in second phase P2 to perform a charge flow between the output terminal of capacitor C4 of charge transfer unit 4 and integrator 5. This charge flow from charge transfer amplifier unit 4 is integrated in capacitor Cf. Thus, the output voltage Vm is updated, i.e. altered by a quantity proportional to the charge accumulated across the common moving electrode during the second phase.

The operation of the electronic circuit described above is asymmetrical, since the fixed electrode of capacitor C1 is always polarized at the same potential $V_{DD}$ in each second phase P2, whereas the fixed electrode of capacitor C2 is always biased at $V_{SS}$ in each second phase P2. This type of integrated electronic circuit thus encounters the same problems of non-linearity mentioned above with reference to stray capacitors and the substrate potential, which is a drawback. Moreover, since the electronic circuit is made in the form of an integrated circuit, any voltage offset linked to unmatched electronic components cannot be removed, which is another drawback.

One way of improving non-linearities in the electronic circuit with a capacitive sensor was proposed in FR Patent No. 2 720 510, on which the electronic circuit of this invention is based. The difference between the electronic circuit presented here and that described above with reference to FIG. 1, is that it advantageously includes another compensation capacitor Cc placed at the integrator unit input. This compensation capacitor mainly compensates for the effects of stray capacitors, particularly those of the capacitive sensor, to increase the gain of the electronic circuit. However, this electronic circuit cannot prevent the electronic circuit output from being blocked or locked at the high potential or low potential of the supply voltage source after an abrupt variation, such as a shock applied to the sensor, outside the electronic circuit measuring range. This causes saturation of the electronic circuit interface, which is a drawback. Even if the high amplitude disappears, the interface saturation remains permanent, which means that the electronic circuit is no longer functional. It is therefore necessary to initialise the electronic circuit completely, for it to operate properly, which involves a relatively large set up time and greater electric power consumption.

SUMMARY OF THE INVENTION

It is thus a main object of the invention to provide an electronic circuit with a capacitive sensor for measuring a physical parameter, which overcomes the aforecited drawbacks to prevent, in particular, the output from being blocked or locked after an abrupt variation, such as a shock applied to the sensor.

The invention therefore concerns the aforecited electronic circuit with a capacitive sensor, for measuring a physical parameter, such as an acceleration, angular velocity, force or pressure, wherein the sensor includes at least two differential-mounted capacitors, whose common electrode can move relative to each fixed electrode of the two capacitors to alter the capacitive value of each capacitor during measurement of the physical parameter, said electronic circuit having an interface connected to the capacitive sensor, which includes:

a charge transfer amplifier unit connected to the common electrode,
   an integrator unit for integrating the charges supplied by the charge transfer amplifier unit and for supplying an output voltage, said integrator unit including a compensation capacitor at input,
   an excitation unit arranged between the output of the integrator unit and the sensor for polarising each fixed electrode of the sensor capacitors at a determined voltage value,
   wherein the electronic circuit interface also includes comparison means for comparing the output voltage with a comparison voltage so as to control disconnection of the compensation capacitor at the integrator unit input, if the deviation between the output voltage and the comparison voltage is above a determined voltage threshold.

Specific embodiments of the electronic circuit are defined in the dependent claims 2 to 7.

One advantage of the electronic circuit lies in the fact that the comparison means can quickly prevent the output from being blocked or locked at a high voltage or low voltage after an abrupt variation, such as a shock applied to the sensor during a force measurement. Owing to the comparison means, such as a dynamic comparator, it is no longer necessary to reinitialise the electronic circuit completely if the output is blocked at a voltage beyond a determined voltage threshold. The output voltage is thus compared to a determined comparison voltage in a comparison period or cycle. Since each measuring cycle of the electronic circuit can comprise two phases of determined time length, the comparison period can be three cycles, i.e. six times the time length of each phase. Disconnection, for example of the compensation capacitor, may occur if the deviation between the output voltage and the comparison voltage is beyond the determined voltage threshold, outside the measuring range.

Advantageously, the electronic circuit can comprise a dual structure with two integrator units and two excitation units operating alternately in total symmetry. Because of this, any compensation for a voltage deviation or offset due to technology or variation in the supply voltage can be minimised or removed using the two output signals from the integrator units. During operation of this electronic circuit, each measuring cycle is divided into four successive phases, with two successive phases for each integrator unit. In this case, a dynamic comparator can perform a comparison between the output voltages of the two integrators. Since each measuring cycle can comprise four successive phases, the comparison period for the electronic circuit is three measuring cycles, i.e. twelve times the time length of each phase. Disconnection of the two compensation capacitors at the input of the integrator units occurs if the deviation between the two output voltages is beyond a determined voltage threshold, outside the measuring range.

The invention also concerns a method of activating the electronic circuit for measuring a physical parameter for controlling the level of an output voltage of at least one integrator unit, for measuring a physical parameter, the method including at least two phases for each successive measuring cycle, consisting:

in a first phase in polarising each fixed electrode of the capacitors of the sensor at the output voltage of the integrator unit via the excitation unit, in a second phase in polarising, via the excitation unit, the fixed electrode of the first capacitor at a high voltage or at a low voltage of a supply voltage source of the electronic circuit, and in polarising the fixed electrode of the second capacitor inversely to the fixed electrode of the first capacitor, at a low voltage or at a high voltage of the voltage source, wherein during successive physical parameter measuring cycles, the activated comparison means compares the output voltage and a comparison voltage, so as to supply a control signal to disconnect the compensation capacitor, if the deviation between the output voltage and the comparison voltage is above a determined voltage threshold, said compensation capacitor remaining disconnected in the subsequent measuring cycles while the voltage deviation remains higher than the voltage threshold.

Particular advantageous steps of the method are defined in the dependent claims 9 to 11.

BRIEF DESCRIPTION OF THE DRAWINGS

The objects, advantages and features of the electronic circuit with a capacitive sensor for measuring a physical parameter, and the method of activating said electronic circuit, will appear more clearly in the following description, with reference to the drawings, in which:

FIG. 6 shows a time diagram of various voltage signals during several measuring cycles, each divided into four phases, of the electronic circuit activation method of FIG. 5 according to the invention.

DETAILED DESCRIPTION OF THE INVENTION

In the following description, since various differential components of the electronic circuit with a capacitive sensor are well known, they will not be explained in detail.

Figure 1:
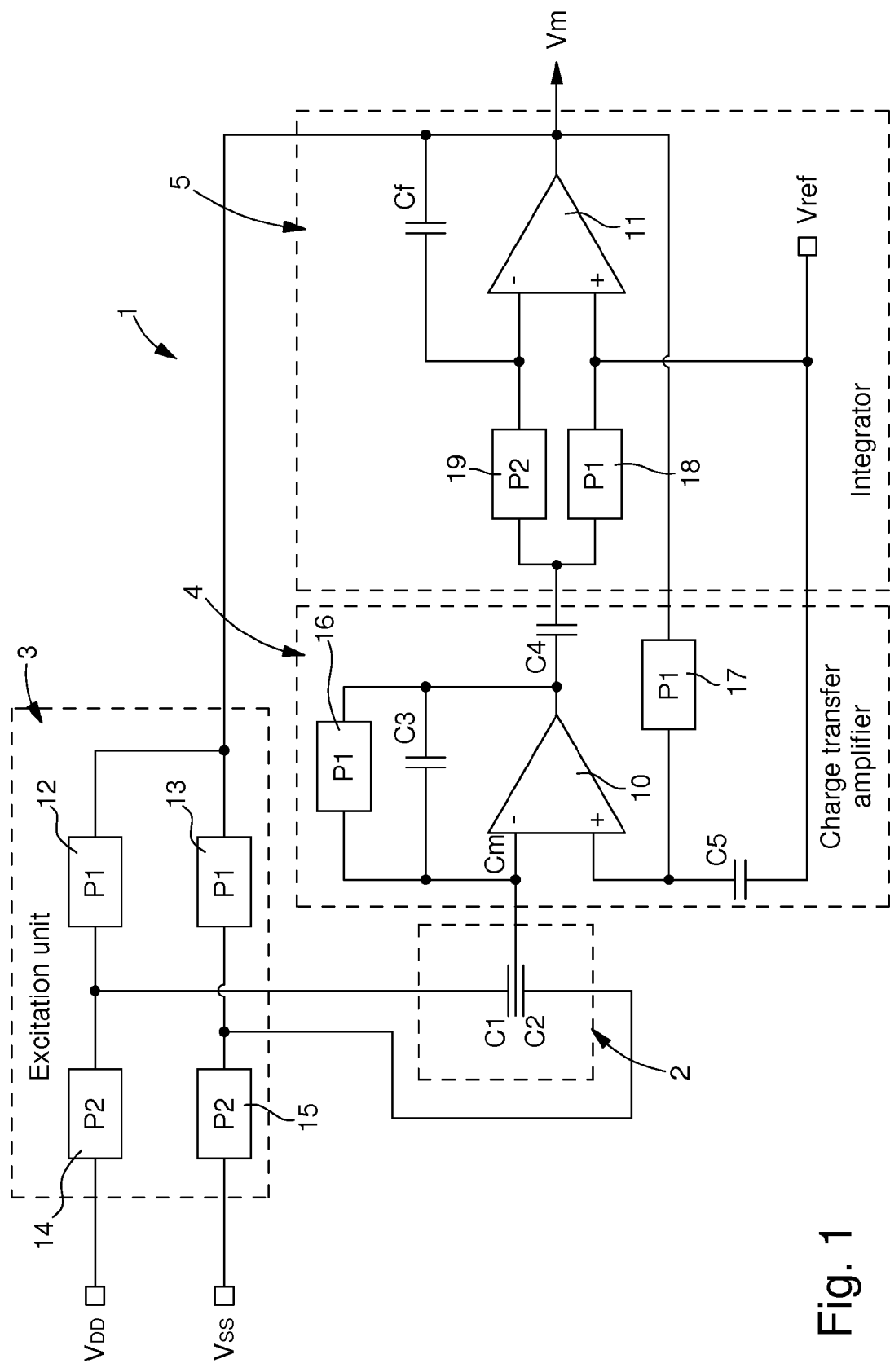
FIG. 1, already cited, shows in a simplified manner an electronic circuit with a capacitive sensor of the prior art, FIG. 2, already cited, shows a time diagram of various voltage signals during several measuring cycles, each divided into two phases, of the electronic circuit activation method of FIG. 1 according to the prior art.
Figure 3:
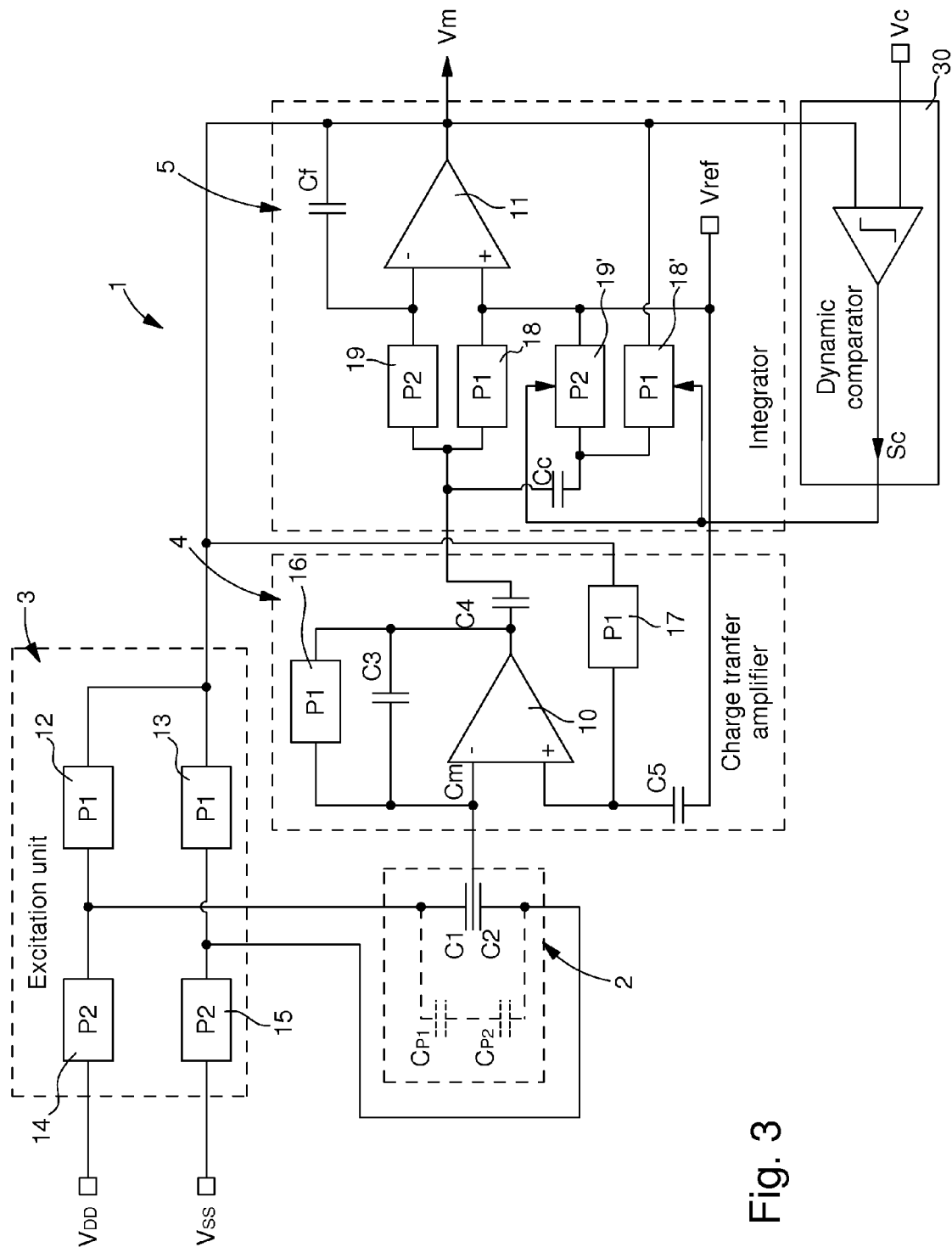
FIG. 3 shows in a simplified manner a first embodiment of an electronic circuit with a capacitive sensor according to the invention.

FIG. 3 shows a simplified diagram of the various components of a first embodiment of the electronic circuit 1 with a capacitive sensor 2 according to the invention. The main difference between this electronic circuit 1 and the electronic circuit of the prior art, shown in FIG. 1, is the connection of a compensation capacitor Cc to integrator unit 5, and the comparison means, such as a dynamic comparator 30. This dynamic comparator 30 is used for controlling the output voltage level Vm relative to a predetermined comparison voltage Vc based on a determined threshold voltage. This prevents the output being blocked by saturation, for example at a high potential $V_{DD}$ or a low potential $V_{SS}$ from a supply voltage source following an abrupt variation across the electronic circuit with a capacitive sensor. This abrupt variation may be caused by a shock to the electronic circuit with a capacitive sensor used, for example, for measuring acceleration. Of course, since excitation unit 3 and charge transfer unit 4 are the same as those explained above with reference to FIG. 1, they will not be described in further detail, for the sake of simplification.

Capacitive sensor 2 generally includes two capacitors mounted in differential. A common electrode Cm of the capacitors can move via the action of a force between two fixed electrodes to define two capacitors with variable capacitance C1 and C2. When inoperative, this common electrode Cm is resiliently held in a central position between the two fixed electrodes. This enables the electronic circuit to supply measurement signals for a physical parameter, such as an acceleration, angular velocity, pressure or force, for example as a function of the movement of the moving common electrode. This capacitive sensor 2 (MEMS) can advantageously be integrated in a semiconductor substrate, such as a silicon substrate. In this case, account must be taken of stray capacitors Cp1 and Cp2, shown in dotted lines in FIG. 3, in parallel with the two capacitors C1 and C2.

Electronic circuit 1 can be powered by a continuous voltage source (not shown) that supplies a high voltage $V_{DD}$ to a first terminal and a low voltage $V_{SS}$ to a second terminal. The low voltage can be defined as 0 V. The fixed electrode of each capacitor can either be polarized at high voltage $V_{DD}$, or at low voltage $V_{SS}$ in the electronic circuit operating mode. Thus, as the two capacitors have an equal capacitive value in the inoperative mode of sensor 2, the voltage across common electrode Cm when it is inoperative is equal to an intermediate voltage $(V_{DD}-V_{SS})/2$ between high voltage $V_{DD}$ and low voltage $V_{SS}$.

Integrator unit 5 has identical elements to those presented with reference to FIG. 1. This integrator unit 5 thus includes two input switches 18 and 19, an operational amplifier 11 and an integration capacitor Cf. This capacitor Cf is connected between the inverter input and the output of amplifier 11, which supplies output voltage Vm of the integrator unit 5. The input switch 18 is arranged between the output terminal of capacitor C4 of charge transfer unit 4 and the non-inverter input of amplifier 11. The potential of this non-inverter input of amplifier 11 is set at reference voltage Vref. Voltage reference Vref can be set at the intermediate voltage $(V_{DD}-V_{SS})/2$. The input switch 19 is arranged between the output terminal of capacitor C4 of charge transfer unit 4 and the inverter input of amplifier 11.

Figure 2:
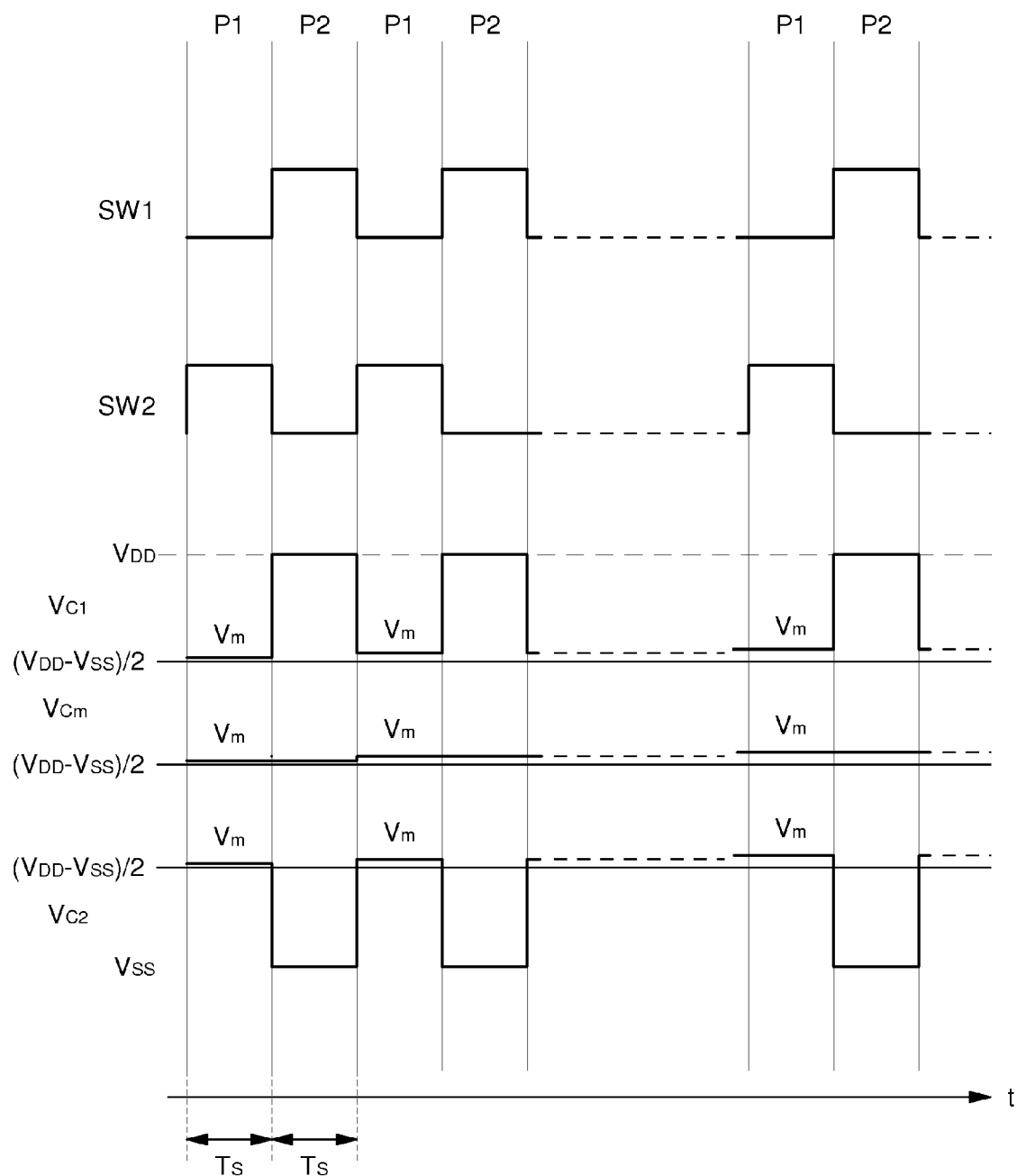

Also with reference to FIG. 2, in the electronic circuit operating mode, each measuring cycle is divided into two phases P1 and P2, each of identical time length Ts, for example around 6 μs. Switch 18 is closed by signals SW2 at the "1" state in first phase P1 so that the voltage across the terminals of capacitor C4 of the charge transfer unit is equal to Vm if reference voltage Vref is preferably at the intermediate voltage $(V_{DD}-V_{SS})/2$, which may be defined as DC earth. Switch 19 is closed by signals SW1 at the "1" state in second phase P2 to carry out a charge flow between the output terminal of capacitor C4 of charge transfer unit 4 and integrator unit 5. This charge flow from charge transfer amplifier unit 4 is integrated in capacitor Cf. Thus, output voltage Vm is updated, i.e. altered by a quantity proportional to the charge accumulated across the moving common electrode during the second phase.

A compensation capacitor Cc is also connected to integrator unit 5 to overcome the effects of stray capacitors Cp1 and Cp2 (shown in dotted lines in FIG. 3) in parallel to capacitors C1 and C2 in sensor 2. For fuller technical information concerning the use of this type of compensation capacitor Cc in this electronic circuit with a capacitive sensor, the reader may refer to FR Patent No. 2 720 510, which is incorporated herein by reference.

A first electrode of compensation capacitor Cc is connected to the output terminal of capacitor C4, and to the input of switches 18 and 19. A second electrode of compensation capacitor CC is connected, via a switch 18', to output voltage terminal Vm, and via a switch 19', to reference voltage terminal Vref. In first phase P1, the second electrode of compensation capacitor Cc is directly connected to output voltage terminal Vm by closing switch 18'. In second phase P2, the second electrode of compensation capacitor Cc is directly connected to reference voltage terminal Vref by closing switch 19'.

Electronic circuit 1 further includes comparison means 30, which is preferably a dynamic comparator, explained below with reference to FIGS. 4a and 4b. In this dynamic comparator 30, output voltage Vm is compared to a determined comparison voltage Vc. This comparison voltage may advantageously be equal to reference voltage Vref, i.e. equal to the intermediate voltage $(V_{DD}-V_{SS})/2$. If the voltage deviation between comparison voltage Vc and output voltage Vm exceeds a determined voltage threshold, an activation control signal Sc is transmitted from the dynamic comparator to the two switches 18' and 19' to open them to disconnect compensation capacitor Cc. By virtue of the control logic of electronic circuit 1, control signal Sc takes priority over all the other control signals to disconnect these two switches 18' and 19'. Control signal Sc takes priority as long as the deviation between output voltage Vm and comparison voltage Vc is greater than the voltage threshold. Relative to an intermediate voltage, this voltage threshold must be higher than the electronic circuit measuring range, but lower than the integrator saturation voltage.

An embodiment of this type of dynamic comparator, and the operating mode thereof for the comparison between output voltage Vm and comparison voltage Vc are explained with reference to FIGS. 4a and 4b.

Figure 4A:
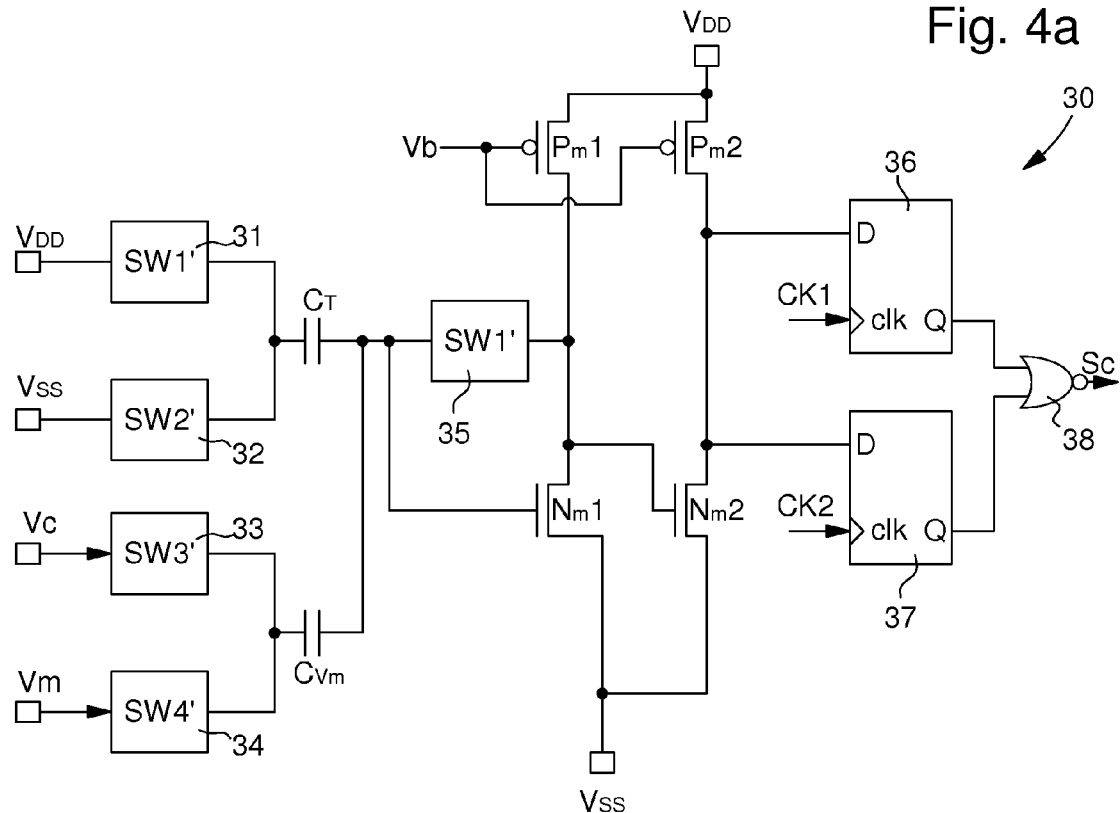
FIGS. 4a and 4b show in a simplified manner one embodiment of a dynamic comparator for the electronic circuit of FIG. 3 according to the invention, and a time diagram of switch control signals and clock signals for the dynamic comparator of the electronic circuit according to the invention.
Figure 4B:
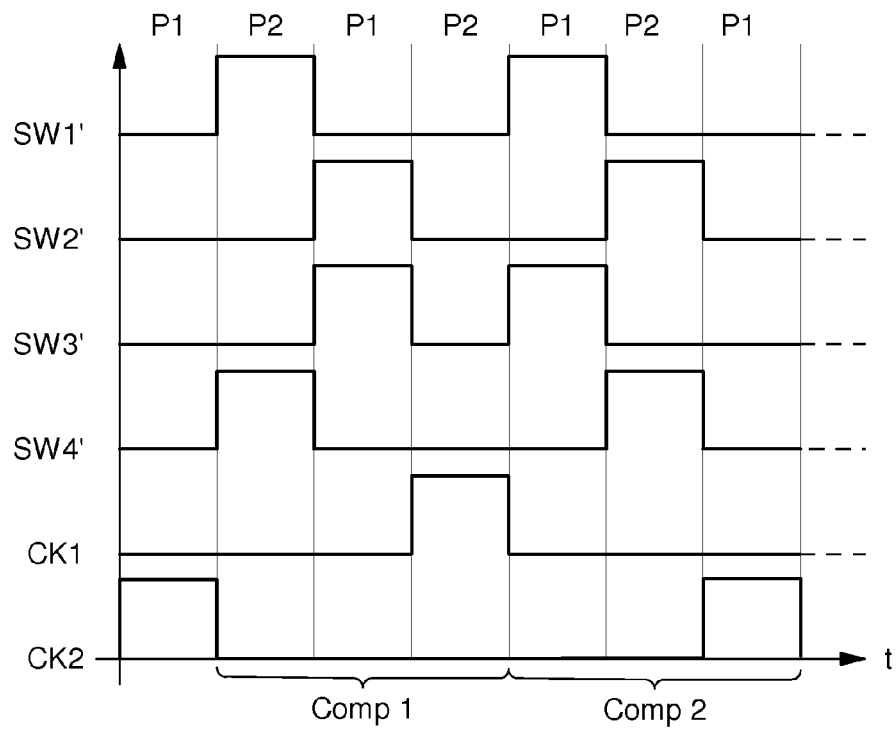

In FIG. 4a, dynamic comparator 30 first includes a threshold capacitor $C_T$, and a control capacitor $C_{Vm}$ for defining a capacitive ratio. As shown in the following formulae, this capacitive ratio determines by multiplying by the high potential value $V_{DD}$ of the supply voltage source whether low potential $V_{SS}$ is at 0 V, the threshold value that must not be exceeded. A capacitive value $C_{Vm}$ equal to 4 times capacitive value $C_T$ may be used, which gives a voltage threshold equal to $V_{DD}/4$.

Both output voltage Vm, subtracted from comparison voltage Vc, and comparison voltage Vc subtracted from output voltage Vm, must be compared to determine whether the output voltage is above or below intermediate voltage $(V_{DD}-V_{SS})/2$. For output voltage Vm to be considered outside the admissible measuring range, the dynamic comparator must therefore take account of the following comparison formulae (1) and (2):

$$(Vc-Vm) > (C_T/C_{Vm}) \cdot V_{DD} \quad (1)$$

and $$(Vm-Vc) > (C_T/C_{Vm}) \cdot V_{DD} \quad (2)$$

In the embodiment of dynamic comparator 30, a first electrode of threshold capacitor $C_T$, is connected via a switch 31 to the high potential terminal $V_{DD}$, and via a switch 32 to the low potential terminal $V_{SS}$ of the supply voltage source (not shown). The second electrode of threshold capacitor $C_T$ is connected to the second electrode of control capacitor $C_{Vm}$, whose first electrode is connected, via a switch 33, to comparison voltage Vc and via a switch 34 to output voltage Vm.

The second electrode of each capacitor $C_T$ and $C_{Vm}$ defines a node, which is connected to a gate of a first NMOS transistor Nm1. This connection node is also connected, via a switch 35, to the drain of the first NMOS transistor Nm1, whose source is connected to low potential terminal $V_{SS}$. If the potential at the connection node of threshold and control capacitors $C_T$ and $C_{Vm}$ is higher than the conduction threshold of the first NMOS transistor Nm1, this transistor can be made conductive. The drain of the first NMOS transistor Nm1 is connected to the drain of a first PMOS transistor Pm1, whose source is connected to high potential terminal $V_{DD}$. The gate of this first transistor Pm1 is polarised by a gate voltage Vb, at least when dynamic comparator 30 is required to be activated. This gate voltage also polarises the gate of a second PMOS transistor Pm2, whose source is also connected to high potential terminal $V_{DD}$. The drain of this second PMOS transistor Pm2 is connected to the drain of a second NMOS transistor Nm2, whose source is connected to low potential terminal $V_{SS}$. The gate of this second NMOS transistor Nm2 is connected to the drains of the first NMOS and PMOS transistors Nm1 and Pm1. This second NMOS transistor Nm2 normally becomes conductive if the first NMOS transistor Nm1 is not conductive, except if switch 35 is closed.

The drains of the second NMOS and PMOS transistors Nm2 and Pm2 are connected to an input of a first D flip-flop 36 and to an input of a second D flip-flop 37. The first flip-flop 36 is clocked by a first clocking or clock signal CK1, whereas the second flip-flop 37 is clocked by a second clocking or clock signal CK2. The Q output of first flip-flop 36 and the Q output of second flip-flop 37 are connected to a NOR logic gate 38, whose output supplies the control signal Sc. This control signal Sc is only at the "0" state to disconnect the compensation capacitor from the integrator if the Q output of at least one of the two flip-flops 36 and 37 is at the high "1" state close to high potential $V_{DD}$.

The two PMOS transistors Pm1 and Pm2, which are deemed current sources, are polarised across their gate by a polarising voltage Vb. This polarising voltage is chosen such that a current of determined value can pass through the PMOS transistors and the NMOS transistors Nm1 or Nm2 if they are conductive. If the gate potential of the first NMOS transistor Nm1 is higher than its conduction threshold, the current of determined value supplied by the first PMOS transistor Pm1 passes through transistor Nm1. The drain potential of the first NMOS transistor Nm1 may, in this case, be close to low potential $V_{SS}$, if switch 35 is open. In these conditions, the second NMOS transistor Nm2 becomes non-conductive, and its drain potential comes close to high potential $V_{DD}$.

In the opposite case in which the gate potential of the first NMOS transistor Nm1 is below its conduction threshold, it becomes non-conductive, and its drain potential comes close to high potential $V_{DD}$, if switch 35 is open. In this case, the second NMOS transistor Nm2 becomes conductive, and the current of determined value supplied by second PMOS transistor Pm2 passes through it. The drain potential of the second transistor Nm2 may, in this case, be close to low potential $V_{SS}$.

A current supplied by the first PMOS transistor Pm1 of around 1 μA and a current supplied by the second PMOS transistor Pm2 of around 500 nA may be defined. In these conditions, the channel width of the second PMOS transistor is two times greater than the channel width of the first PMOS transistor.

The method of controlling the level of output voltage Vm by the comparison means, such as dynamic comparator 30, during physical parameter measuring cycles of the electronic circuit, can be explained with reference to FIG. 4b. FIG. 4b shows a time diagram of various control signals SW1' to SW4' for switches 31 to 35 of FIG. 4a, and operating dynamic comparator clock signals CK1 and CK2 for the electronic circuit. The state of each control signal is shown in the series of measuring cycles, which are each divided into two phases P1 and P2, as explained above.

To perform a comparison of output voltage level Vm, the comparison period corresponds to three measuring cycles, i.e. six times the time length Ts of each phase P1, P2. First, output voltage Vm subtracted from comparison voltage Vc must be checked, to determine whether this difference (Vc−Vm) is greater than the threshold voltage defined above. This first comparison Comp 1 will last three successive phases, starting, as shown in FIG. 4b, from a phase P2, given that this comparison begins when output voltage Vm is updated.

Next, comparison voltage Vc subtracted from output voltage Vm must be checked to see whether this difference (Vm−Vc) is greater than the threshold voltage. This second comparison Comp 2 will also last for three successive phases directly after the first comparison Comp 1. Again, output voltage Vm is connected to the comparator in phase P2 of comparison Comp 2. At the end of the two comparisons, given that the output voltage may be above or below the intermediate voltage, a control signal Sc is supplied to disconnect the compensation comparator if the deviation between comparison voltage Vc and output voltage Vm is greater than the determined voltage threshold.

To start the first comparison Comp 1 in phase P2, control signals SW1' and SW4' are at the "1" state to close switches 31, 34 and 35 of FIG. 4a. The first electrode of threshold capacitor $C_T$ is thus connected to high potential $V_{DD}$, while the first electrode of control capacitor $C_{Vm}$ is connected to output voltage Vm, which is in an updating phase. The capacitive divider formed by the two capacitors $C_T$ and $C_{Vm}$ thus defines the potential at the connection node of the two capacitors.

In order for the first NMOS transistor Nm1 to be conductive, its gate voltage Vg1 must be higher than a threshold voltage Vt. Given that switch 35 is closed in this phase P2, gate voltage Vg1 of the first conductive NMOS transistor is equal to its drain voltage Vd added to its threshold voltage Vt. In these conditions, the gate voltage of second transistor Nm2 is also higher than its threshold voltage, which means that the second NMOS transistor is also conductive. The voltage at the D input of first flip-flop 36, and of second flip-flop 37 is close to low potential $V_{SS}$.

The charge q1 at the node of capacitors $C_T$ and $C_{Vm}$, which is connected to the gate and drain of the first NMOS transistor Nm1, is defined by the following formula:

$$q1=(Vg1-V_D)\cdot C_T+(Vg1-Vm)\cdot C_{Vm}$$

In the second phase of comparison Comp 1, which corresponds to phase P1 of a measuring cycle, switches 32 and 33 are closed by control signals SW2' and SW3', while switches 31, 34 and 35 are open. The first electrode of threshold capacitor $C_T$ is thus connected to low potential $V_{SS}$, while the first electrode of control capacitor $C_{Vm}$ is connected, this time, to comparison voltage Vc. The capacitive divider formed by the two capacitors $C_T$ and $C_{Vm}$, thus defines the potential at the connection node of the two capacitors. The gate of first NMOS transistor Nm1 is polarised by voltage Vg2 at the connection node of the two capacitors $C_T$ and $C_{Vm}$.

Charge q2 at the node of capacitors $C_T$ and $C_{Vm}$, which is only connected to the gate of the first NMOS transistor Nm1, is defined by the following formula:

$$q2=(Vg2-V_{SS})\cdot C_T+(Vg2-Vc)\cdot C_{Vm}$$

At the end of the first comparison cycle Comp 1, the charge balance Δq with the deviation between the two gate voltages ΔVg, is given by the following formula:

$$\Delta q=q2-q1=\Delta Vg\cdot(C_T+C_{Vm})+(V_{DD}-V_{SS})\cdot C_T+(Vm-Vc)\cdot C_{Vm}=0$$

Normally, if ΔVg is greater than 0, the first NMOS transistor Nm1 is conductive, whereas the second NMOS transistor Nm2 is non-conductive with its gate voltage close to low potential $V_{SS}$. The output of the first flip-flop 36 will pass to "1", i.e. to high potential $V_{DD}$, when signal CK1 gives the clock pulse in the last phase of first comparison Comp 1. However, if ΔVg is lower than 0, the first NMOS transistor is non-conductive, while the second NMOS transistor is conductive. In this case, the output of flip-flop 36 will pass to "0", i.e. to low potential $V_{SS}$, when signal CK1 gives the clock pulse. The voltage threshold is thus defined when deviation ΔVg is equal to 0 V. In this case, measuring voltage Vm subtracted from comparison voltage Vc is equal to $(C_T/C_{Vm})\cdot V_{DD}$ if $V_{SS}$ is at 0 V. As indicated above, this voltage threshold can be defined with $C_{Vm}$ equal to 4 times $C_T$, which gives a voltage threshold of $V_{DD}/4$.

For the second comparison Comp 2, this time, comparison voltage Vc must be subtracted from measuring voltage Vm. To start this second comparison Comp 2, control signals SW1' and SW3' close switches 31, 33 and 35, while switches 32 and 34 of FIG. 4a are opened. The first electrode of threshold capacitor $C_T$ is connected to $V_{DD}$, whereas the first electrode of control capacitor $C_{Vm}$ is connected to Vc. In the second phase of the second comparison Comp 2, the control signals close switches 32 and 34, while switches 31, 33 and 35 are opened. The first electrode of threshold capacitor $C_T$ is connected to $V_{SS}$, while the first electrode of control capacitor $C_{Vm}$ is connected to Vm.

At the end of this second comparison Comp 2, the second clock signal CK2 clocks the second flip-flop 37 to transmit the state of the signal at the D input to the Q output. If the second NMOS transistor Nm2 is not conductive, the Q output of the second flip-flop is at the "1" state, whereas if the second NMOS transistor is conductive, the Q output is at the "0" state. Logic gate 38, which receives the two output signals from flip-flops 36 and 37, supplies control signal Sc. This control signal is only at the "0" state to disconnect the compensation capacitor from the integrator unit if at least one of the two Q outputs is at the "1" state. The deviation between measuring voltage Vm and comparison voltage Vc is thus controlled above the voltage threshold.

Several successive comparison cycles can be carried out using the dynamic comparator during operation of the electronic circuit to measure a physical parameter. However, one could also envisage activating the dynamic comparator for programmed operating periods to avoid leaving the dynamic comparator continually switched on during the physical parameter measuring cycles.

Figure 5:
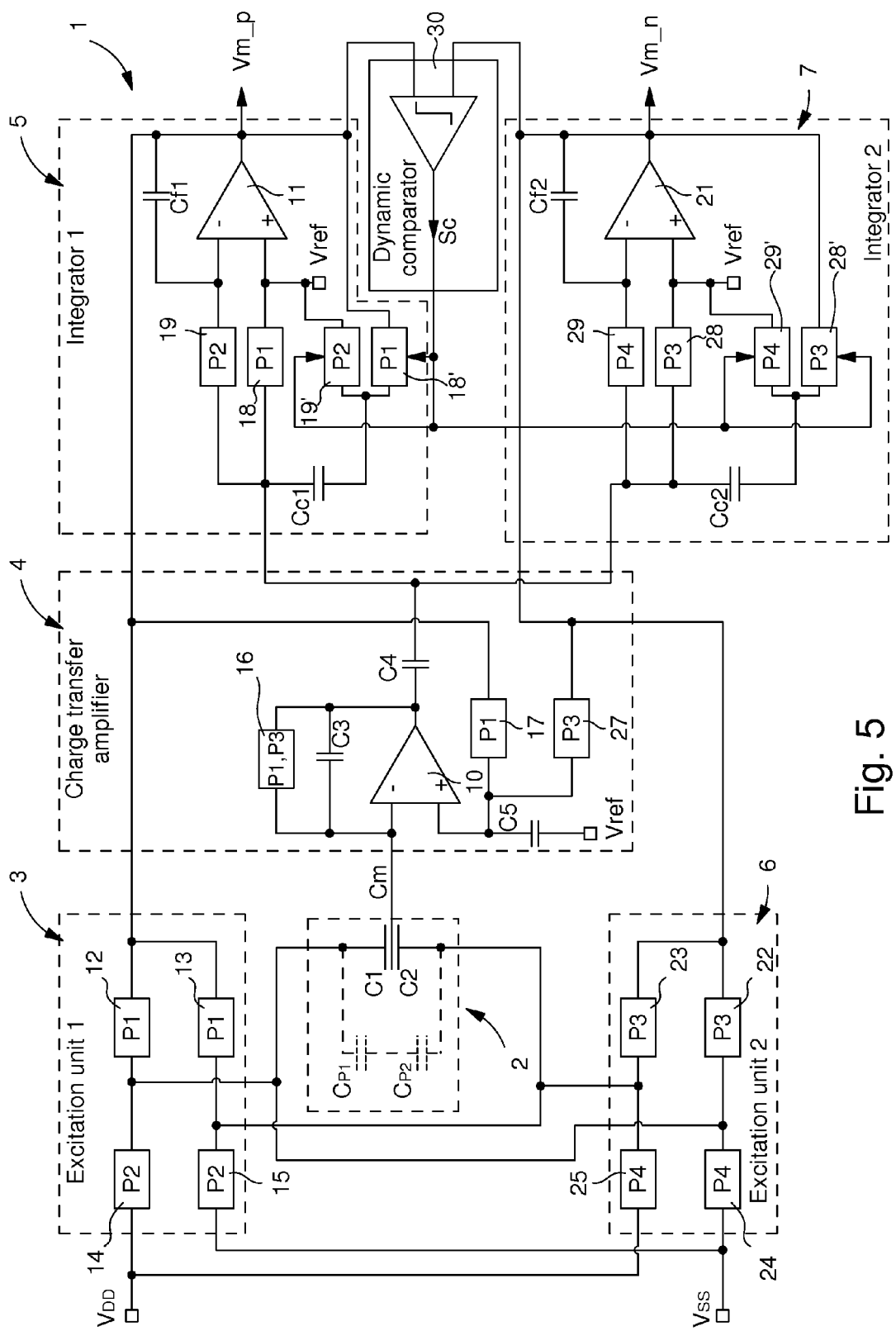
FIG. 5 shows in a simplified manner a second embodiment of an electronic circuit with a capacitive sensor according to the invention.

As for the embodiments shown in FIGS. 1 and 3, the electronic circuit 1 of FIG. 5 includes identical elements, which bear the same reference signs and which, for the sake of simplification, will not all be explained in detail. This electronic circuit 1 thus includes a charge transfer amplifier unit 4, which is connected at input to common electrode Cm, a first integrator unit 5 and a second integrator unit 7, both of identical structure and connected to the output of amplifier unit 4, a first excitation unit 3 arranged between the output of the first integrator unit 5 and sensor 2, and a second excitation unit 6 arranged between the output of the second integrator unit 7 and sensor 2. A first compensation capacitor Cc1 is connected to the first integrator unit 5, while a second compensation capacitor Cc2 is connected to the second integrator unit 7.

In the charge transfer amplifier unit 4, switch 17 is arranged between the output of the first integrator unit 5 and the non-inverter input of amplifier 10, and switch 27 is arranged between the output of second integrator unit 7 and the non-inverter input of amplifier 10. When switch 17 is closed, capacitor C5 is polarised by output voltage Vm_p, whereas when switch 27 is closed, capacitor C5 is polarised by output voltage Vm_n. However, this charge transfer amplifier unit 4 operates in a similar way to that explained with reference to FIGS. 1 and 3.

The first integrator unit 5 permanently supplies an output voltage Vm_p equal to charge integral supplied by amplifier unit 4, whereas the second integrator unit 7 permanently supplies at output an inverse voltage Vm_n of voltage Vm_p relative to an intermediate, inoperative voltage $(V_{DD}-V_{SS})/2$. Each excitation unit 3 and 6 alternately and cyclically polarises the fixed electrodes at specified voltage levels, as described below. For fuller technical information about this dual structure interface of electronic circuit 1 with a capacitive sensor, the reader may refer to EP Patent No. 1 835 263, which is incorporated herein by reference.

The first excitation unit 3 includes four switches 12, 13, 14 and 15, which can be formed by MOS switching transistors in the integrated circuit. Switches 12 to 15 of electronic circuit 1 are connected in the same way as those of the electronic circuit shown in FIGS. 1 and 3.

The second excitation unit 6 has a similar structure to the first excitation unit 3. This second excitation unit 6 also includes four switches 22, 23, 24 and 25 formed by MOS transistors in the integrated circuit. The first switch 22 is arranged between the output of second integrator unit 7 and the fixed electrode of capacitor C1. The second switch 23 is arranged between the output of second integrator unit 7 and the fixed electrode of capacitor C2. The third switch 24 is arranged between the low voltage terminal $V_{SS}$ and the fixed electrode of capacitor C1. Finally, the fourth switch 25 is arranged between the high voltage terminal $V_{DD}$ and the fixed electrode of capacitor C2.

When electronic circuit 1 is activated, each successive operating period or cycle is divided into four phases P1 to P4 as shown in FIG. 6, each of identical time length Ts, which may be around 6 µs. The change from one phase to another is controlled by clock signals (not shown) which respectively open and close the switches of the first and second excitation units 3 and 6. In the first two phases P1 and P2, the first integrator unit 5, and the first excitation unit 3, are operative, whereas in the third and fourth phases P3 and P4, the second integrator unit 7 and the second excitation unit 6 are operative. Consequently, at each half-period, the first integrator unit 5 and excitation unit 3, and the second integrator unit 7 and excitation unit 6 are activated alternately and symmetrically.

It is to be noted that in the series of phases for measuring a physical parameter, each switch of electronic circuit 1 is closed in the phase indicated in each switch in FIG. 5.

As for the first embodiment of FIG. 3, first integrator unit 5 includes the two input switches 18 and 19, connected in the same manner, an operational amplifier 11 and an integration capacitor Cf1. This capacitor Cf1 is connected between the inverter input and the output of amplifier 11, which supplies output voltage Vm_p of first integrator unit 5. The potential of the non-inverter input of amplifier 11 is set at reference voltage Vref, which can be defined as the intermediate voltage $(V_{DD}-V_{SS})/2$.

The second integrator unit 7 also includes two input switches 28 and 29, an operational amplifier 21 and an integration capacitor Cf2. This capacitor Cf2 is connected between the inverter input and the output of amplifier 21, which supplies output voltage Vm_n of second integrator unit 7. Input switch 28 is arranged between the output terminal of capacitor C4 of charge transfer unit 4 and the non-inverter input of amplifier 21. The potential of the non-inverter input of amplifier 21 is set at reference voltage Vref. Switch 29 is arranged between the output terminal of capacitor C4 of charge transfer unit 4 and the inverter input of amplifier 21.

A first electrode of the first compensation capacitor Cc1 is connected to the output terminal of capacitor C4, and to the input of switches 18 and 19 of first integrator unit 5. A second electrode of compensation capacitor Cc1 is directly connected by closing a switch 18' at the output voltage terminal Vm_p of first integrator unit 5 in first phase P1. This second electrode of compensation capacitor Cc1 is directly connected to reference voltage terminal Vref by closing a switch 19' in second phase P2.

A first electrode of second compensation capacitor Cc2 is connected to the output terminal of capacitor C4, and to the input of switches 28 and 29 of second integrator unit 7. A second electrode of compensation capacitor Cc2 is directly connected by closing a switch 28' at output voltage terminal Vm_n of second integrator unit 7 in third phase P3. This second electrode of the compensation capacitor Cc2 is directly connected to reference voltage terminal Vref by closing a switch 29' in fourth phase P4.

In the electronic circuit operating mode, switches 18, 18', 19, 19', 28, 28', 29 and 29' are closed by signals SW1 to SW4 at the "1" state in each corresponding phase, as indicated above. The phase indication in which each of the switches is closed is thus mentioned in each switch in FIG. 5 for the sake of simplification.

It is to be noted that, at the "1" state, the time length of some switch control signals may be slightly greater than other control signals. This allows some switches to be opened or closed before other switches in each phase P1 to P4.

Electronic circuit 1 further includes comparison means 30, which is preferably a dynamic comparator, explained below with reference to FIGS. 7a and 7b. In this dynamic comparator 30, output voltage Vm_p is compared, this time, to output voltage Vm_n, which acts as comparison voltage. If the voltage deviation between output voltage Vm_p and output voltage Vm_n exceeds a determined voltage threshold, an activation control signal Sc is transmitted from dynamic comparator 30 to the four switches 18', 19', 28' and 29' to open them in order to disconnect compensation capacitors Cc1 and Cc2.

Note that in this second embodiment, the voltage threshold can be defined as twice the voltage threshold of the first embodiment of FIG. 3. By virtue of the control logic of electronic circuit 1, control signal Sc takes priority over all the other control signals so as to open these four switches 18', 19', 28' and 29' and thus disconnect compensation capacitors Cc1 and Cc2. This control signal Sc takes priority as long as the deviation between the two output voltages Vm_p and Vm_n is greater than the voltage threshold. This voltage threshold must be higher than the electronic circuit measuring range, but lower than the saturation voltage of each integrator unit.

Owing to dynamic comparator 30, this quickly prevents the outputs from being blocked or locked at a high voltage or low voltage following an abrupt variation, such as a shock applied to the sensor during a force measurement. The momentary disconnection of the compensation capacitors avoids the need to reinitialise electronic circuit 1 completely.

With reference to FIG. 6, during normal operation of the electronic circuit without any abrupt variation, such as a shock on the sensor, first of all, signals SW4 close switches 12 and 13 at the "1" state in the first phase referenced P1, while switches 14, 15, 22 to 25 are open in first phase P1. In first phase P1, the voltage Vm_p present at the output of first integrator unit 5 is applied to each electrode of sensor 2. This means that the two capacitors are completely discharged, as shown in the $V_{C1}$, $V_{Cm}$ and $V_{C2}$ voltage diagrams.

Signals SW3 then close switches 14 and 15 at the "1" state in the second phase referenced P2, whereas switches 12, 13, 22 to 25 are open. In second phase P2, voltage $V_{SS}$ is applied to the fixed electrode C2 seen in the $V_{C2}$ diagram, whereas voltage $V_{DD}$ is applied to fixed electrode C1 seen in the $V_{C1}$ diagram. Output voltage Vm_p is updated in this second phase P2. If the moving electrode is moved a certain distance in the direction of one or other of the fixed electrodes, the capacitances of the capacitors will vary inversely.

As shown in FIG. 6, moving electrode Cm has moved towards the fixed electrode of capacitor C1. This makes capacitance C1 greater than capacitance C2. This will cause a difference in the charges accumulated by each capacitor, which also depends upon the voltage Vm_p previously applied to each of the capacitor electrodes. The output voltage Vm_p of first integrator unit 5 tends towards a final voltage Vm_p, which, in this case, is higher than the intermediate voltage $(V_{DD}-V_{SS})/2$ after several measuring cycles.

In the third phase referenced P3, signals SW2 close switches 22 and 23 of the second excitation unit 6 at the "1" state, whereas switches 24, 25, 12 to 15 are open in this third phase P3. In third phase P3, the voltage Vm_n present at the output of second integrator unit 7 is applied to each electrode of sensor 2. This enables the two capacitors to be completely discharged at voltage Vm_n, as shown by the $V_{C1}$, $V_{Cm}$ and $V_{C2}$ voltage diagrams.

Signals SW1 then close switches 24 and 25 at the "1" state in the fourth phase P4, whereas switches 22, 23, 12 to 15 are open. In fourth phase P4, voltage $V_{DD}$ is applied to the fixed electrode C2 seen in the $V_{C2}$ diagram, whereas voltage $V_{SS}$ is applied to fixed electrode C1 seen in the $V_{C1}$ diagram. Output voltage Vm_n is updated in this fourth phase P4. As can be observed in these diagrams, by alternately polarising each fixed electrode C1 or C2, once at $V_{DD}$ and once at $V_{SS}$, in each measuring cycle, electronic circuit 1 thus operates totally symmetrically.

The final value of voltage Vm_p at the output of first integrator unit 5 and the final value of voltage Vm_n at the output of second integrator unit 7 are obtained after several operating cycles of the electronic circuit. Initially, voltages Vm_p and Vm_n are equal to the intermediate voltage $(V_{DD}-V_{SS})/2$. These voltage values are a function of the movement of the mobile electrode between the two fixed electrodes as shown in the $V_{Cm}$ voltage diagram. In this case, the common electrode has moved towards the fixed electrode of capacitor C1. This results in a final output voltage Vm_p of first integrator unit 5 above the medium voltage $(V_{DD}-V_{SS})/2$, and a final output voltage Vm_p of second integrator unit 7 below $(V_{DD}-V_{SS})/2$.

After several measuring cycles, for example 50 cycles, and without any abrupt variation, such as a shock to the sensor, the final voltage deviation between Vm_p and $(V_{DD}-V_{SS})/2$ and the final voltage deviation between Vm_n and $(V_{DD}-V_{SS})/2$ are equal and both below a determined voltage threshold. This means two measuring signals can be processed in a processing circuit (not shown) to compensate for the aforementioned non-linearities due to the substrate potential and stray capacitances.

On balance, the voltage difference Vme between the final output voltage Vm_p and the final output voltage Vm_n, which is processed by a processing circuit connected to the interface of electronic circuit 1, can be expressed by the following formula:

$$Vme = Vm\_p - Vm\_n = ((C1-C2)/(C1+C2+2 \cdot Cp - (C3/C4) \cdot Cc)) \cdot V_{DD}$$

where Cp=Cp1=Cp2, and Cc=Cc1=Cc2=2·(C4·Cp/C3).

To give a non-limiting order of grandeur to the different capacitive values, the capacitance of each capacitor C1 or C2 is around 450 fF when in operative. The capacitance of capacitor C3 may be around 600 fF. The capacitance of capacitor C4 may be around 1 pF. The capacitance of capacitor C5 may be around 1.8 pF. The capacitance of each compensation capacitor Cc may be around 333 fF. The capacitance of each stray capacitor Cp may be around 100 fF. The capacitance of capacitors Cf1 and Cf2 may be around 5 pF. The capacitance of threshold capacitor $C_{T2}$ of the dynamic comparator of FIG. 7a may be around 125 fF, and that of control capacitor $C_{Vm2}$ may be around 250 fF, which gives a voltage threshold equal to $V_{DD}/2$. The time length Ts of every phase of each cycle is approximately 6 µs, which gives a final measuring voltage after approximately 1 ms. Moreover, the sensor can be configured such that electronic circuit 1 supplies a voltage deviation between output voltage Vm_p and the intermediate voltage $(V_{DD}-V_{SS})/2$ of 20 mV for 1 g of acceleration, for example, within a measuring range of up to 8 g.

An embodiment of the dynamic comparator and the operating mode thereof, for the comparison between output voltages Vm_p and Vm_n, are explained with reference to FIGS. 7a and 7b.

Figure 7A:
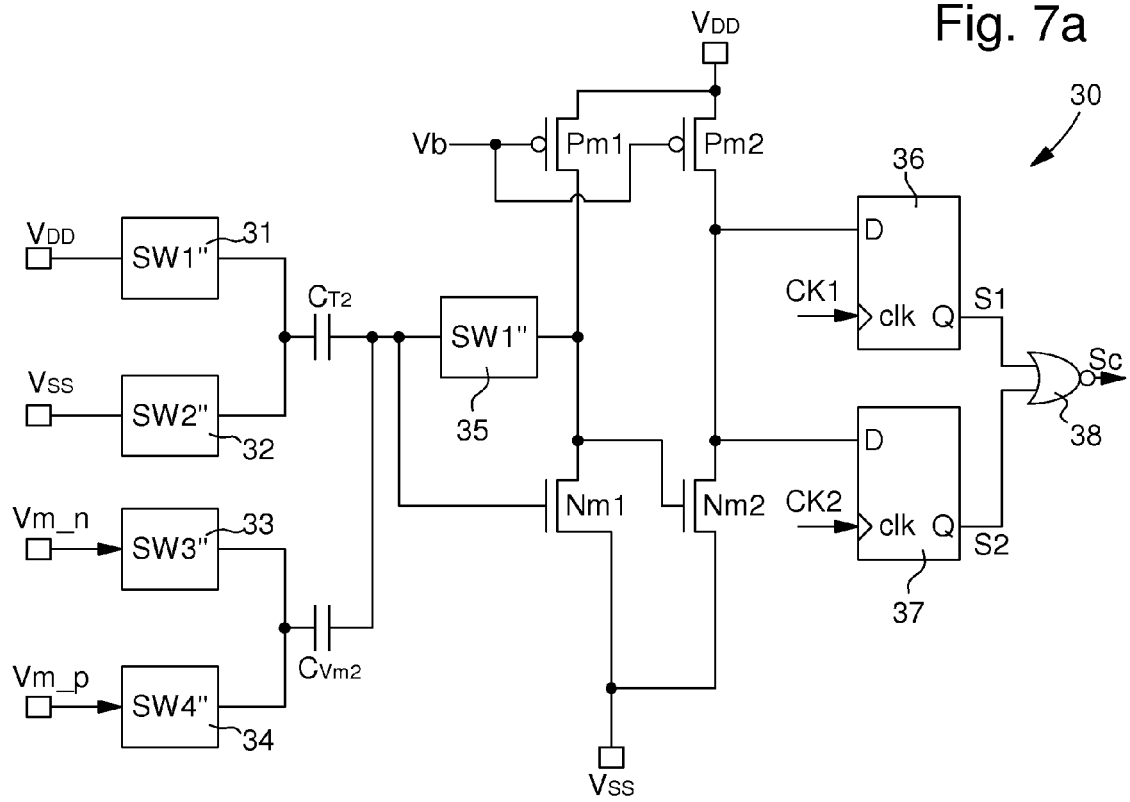
FIGS. 7a and 7b show in a simplified manner one embodiment of a dynamic comparator for the electronic circuit of FIG. 5 according to the invention, and a time diagram of switch control signals and clock signals for the dynamic comparator of the electronic circuit according to the invention.
Figure 7B:
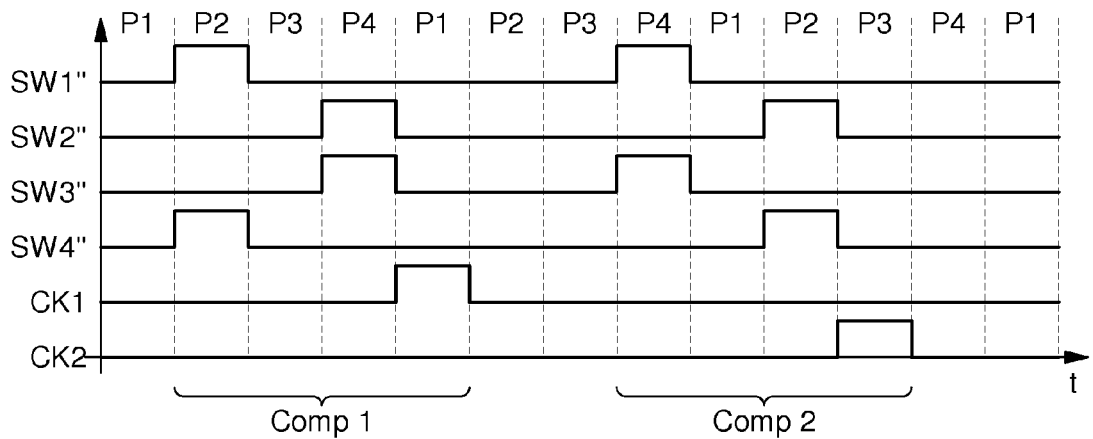

In FIG. 7a, dynamic comparator 30 includes the same elements as those described with reference to FIG. 4a with identical reference signs. Consequently, for the sake of simplification, the detailed description of most of the dynamic comparator elements will not be repeated. The only difference is that the comparison voltage is replaced by output voltage Vm_n, which is compared to output voltage Vm_p.

This dynamic comparator 30 also includes a threshold capacitor $C_{T2}$ and a control capacitor $C_{Vm2}$ for defining a capacitive ratio. As shown in the formulae below, this capacitive ratio determines, by multiplying by the value of high potential $V_{DD}$ of the supply voltage source, the voltage threshold that must not be exceeded. This voltage threshold can be defined as a function of the capacitive values of capacitors $C_{T2}$ and $C_{Vm2}$ as being twice the voltage threshold of the dynamic comparator embodiment of FIG. 4a. Both output voltage Vm_p subtracted from output voltage Vm_n, and output voltage Vm_n subtracted from output voltage Vm_p must also be compared, depending upon whether output voltage Vm_p is above or below output voltage Vm_n. For output voltages Vm_p and Vm_n to be considered outside the admissible measuring range, the dynamic comparator must therefore take account of the following comparison formulae (1) and (2)

$$(Vm\_n - Vm\_p) > (C_{T2}/C_{Vm2}) \cdot V_{DD} \quad (1)$$

and $$(Vm\_p - Vm\_n) > (C_{T2}/C_{Vm2}) \cdot V_{DD} \quad (2)$$

In the embodiment of dynamic comparator 30, a first electrode of threshold capacitor $C_{T2}$ is connected, via a switch 31, to the high potential terminal $V_{DD}$, and, via a switch 32, to the low potential terminal $V_{SS}$ of the supply voltage source (not shown). The second electrode of the threshold capacitor $C_{T2}$ is connected to the second electrode of control capacitor $C_{Vm2}$, whose first electrode is connected, via a switch 33, to output voltage Vm_n and, via a switch 34, to output voltage Vm_p.

As in the embodiment of FIG. 4a, the second electrode of each capacitor $C_{T2}$ and $C_{Vm2}$ defines a node that is connected to a gate of a first NMOS transistor Nm1, and via a switch 35 to the drain of transistor Nm1. Dynamic comparator 30 also includes a first PMOS transistor Pm1, a second PMOS transistor Pm2, a second NMOS transistor Nm2, two D flip-flops 36 and 37, each clocked by a respective clock signal CK1 and CK2, and a NOR logic gate 38 that supplies control signal Sc. All of the same elements are connected in an identical manner to those of FIG. 4a, which bear the same reference signs, and are therefore not described in more detail here for the sake of simplification.

The method of checking the level of output voltages Vm_p and Vn_n using the comparison means, such as dynamic comparator 30, during physical parameter measuring cycles of the electronic circuit, can be explained with reference to FIG. 7b. FIG. 7b shows a time diagram of the various control signals SW1" to SW4", switches 31 to 35 of FIG. 7a, and operating dynamic comparator clock signals CK1 and CK2 for the electronic circuit. The state of each control signal is shown in the series of measuring cycles, which are each divided into four phases P1 to P4 of identical time length Ts, as explained above. Each output voltage is connected to the comparator when it is updated, i.e. in second phase P2 for output voltage Vm_p and in fourth phase P4 for output voltage Vm_n.

The time length of the comparison period is three measuring cycles, starting from second phase P2, particularly for connecting output voltage Vm_p to dynamic comparator 30. Thus, first, output voltage Vm_p, subtracted from output voltage Vm_n is checked, to see whether this difference (Vm_n–Vm_p) is higher than the threshold voltage defined above. This first comparison Comp 1 will last six successive phases starting, as shown in FIG. 7b, from second phase P2 and ending in two phases with no action before the start of second comparison Comp 2.

Next, output voltage Vm_n subtracted from output voltage Vm_p must be checked to discover whether this difference (Vm_p–Vm_n) is higher than the threshold voltage. This second comparison Comp 2 will also last six successive phases after first comparison Comp 1, and will also end in two phases with no action before a new comparison starts with first comparison Comp 1. Once the two comparisons have been made, a control signal Sc is supplied to disconnect the compensation capacitors from the first and second integrator units, if the deviation between output voltages Vm_p and Vm_n is higher than the determined voltage threshold.

To avoid repeating each identical comparison phase previously explained with reference to FIGS. 4a and 4b, we simply indicate the connection of the various switches by controls signals SW1" to SW4" and clock signals CK1 and CK2 of the two flip-flops for the two comparisons Comp1 and Comp 2 shown in FIG. 7b. At the start of the first comparison in phase P2, controls signals SW1" and SW4" close switches 31, 34 and 35 at the "1" state, whereas the other switches 32 and 33 are open. The first electrode of capacitor $C_{T2}$ is connected to $V_{DD}$ and the first electrode of capacitor $C_{Vm2}$ is connected to the first output voltage Vm_p. In phase P3, all of the switches are open. In phase P4, control signals SW2" and SW3" close switches 32 and 33 at the "1" state. The first electrode of capacitor $C_{T2}$ is connected to $V_{SS}$ and the first electrode of capacitor $C_{Vm2}$ is connected to second output voltage Vm_n, as the comparison voltage. The first flip-flop 36 is clocked by clock signal CK1, which passes to state "1" in phase P1 to transmit at the Q output the state of the D input. In the next phases P2 and P3, all of the switches are open before the start of the second comparison Comp 2.

The second comparison Comp 2 starts at phase P4 of updating second output voltage Vm_n. In phase P4, control signals SW1" and SW3" close switches 31, 33 and 35 at the "1" state, whereas switches 32 and 34 are open. In the next phase P1, all of the switches are open. In the next phase P2, control signals SW2" and SW4" close switches 32 and 34 at the "1" state, whereas switches 31, 33 and 35 are open. The second flip-flop 37 is clocked by clock signal CK2, which passes to state "1" in phase P3 to transmit at the Q output the state of the D input of the second flip-flop. In the following phases P4 and P1, all of the switches are open before the start of a new comparison. The output of logic gate 38 supplies a control signal Sc, which is at state "0", if the deviation between output voltages Vm_p and Vm_n is above the voltage threshold.

Of course, clock signals CK1 and CK2 may be involved, either in phase P2 or P3 for first comparison Comp 1 with first clock signal CK1, or in phase P4 or P1 for the second comparison Comp 2 with second clock signal CK2.

From the description that has just been given, those skilled in the art can devise multiple variants of the electronic circuit with a capacitive sensor without departing from the scope of the invention as defined by the claims. One could envisage activating the comparison means after several measuring cycles once the electronic circuit has been activated to measure a physical parameter. This comparison means may be activated cyclically to check the state of the output voltage(s) of the electronic circuit.

What is claimed is:

1. An electronic circuit comprising:
   (a) a capacitive sensor disposed to measure a physical parameter, wherein the sensor includes at least two differential-mounted capacitors, wherein each differential-mounted capacitor has a fixed electrode, wherein the at least two differential-mounted capacitors share a common electrode that is movable relative to each fixed electrode of the at least two capacitors, and wherein the common electrode is moved to alter the capacitive value of each capacitor during measurement of the physical parameter; and
   (b) an interface connected to the capacitive sensor, wherein the interface includes
      (i) a charge transfer amplifier unit connected to the common electrode,
      (ii) an integrator unit disposed to integrate the charges supplied by the charge transfer amplifier unit and to supply an output voltage, wherein the integrator unit includes a first compensation capacitor at input,
      (iii) an excitation unit arranged between the output of the integrator unit and the sensor, wherein the excitation unit is disposed to polarize each fixed electrode of the sensor capacitors at a determined voltage value, and
      (iv) comparison means disposed to compare the output voltage with a comparison voltage and to control disconnection of the compensation capacitor at the integrator unit input if the deviation between the output voltage and the comparison voltage is above a determined voltage threshold;
   wherein the comparison means is a dynamic comparator, wherein the comparison means includes at input a threshold capacitor that is connected to a control capacitor and disposed to define a capacitive ration, and wherein the capacitive ratio determines, by multiplying by a voltage value that corresponds to a low potential subtracted from a high potential of the supply voltage source, the determined voltage threshold;
   wherein a first electrode of the threshold capacitor is connected at input via a first switch of the comparator to the high potential and via a second switch to the low potential of the supply voltage source, wherein a second electrode of the threshold capacitor is connected to a second electrode of the control capacitor and defines a connection node, wherein the first electrode of the control capacitor is connected, via a third switch, to the comparison voltage and, via a fourth switch, to the output voltage of the first integrator unit; and
   wherein the switches are controlled by the dynamic comparator, and wherein the comparator compares the output voltage subtracted from the comparison voltage, and the comparison voltage subtracted from the output voltage.

2. The electronic circuit according to claim 1, wherein the electronic circuit interface further comprises:
   (v) a second integrator unit with the same structure as the first integrator unit, disposed to integrate the charges supplied by the charge transfer amplifier, wherein the second integrator unit includes at input a second compensation capacitor that can be disconnected like the first compensation capacitor via the comparison means if the deviation between the output voltage of the first integrator unit and the output voltage of the second integrator unit is above a determined voltage threshold, wherein the output voltage of the second integrator unit defines the comparison voltage, and wherein the first and second integrator units are arranged to operate alternately and cyclically in each measuring cycle; and
   (vi) a second excitation unit arranged between the output of the second integrator unit and the sensor, wherein the second excitation unit is disposed to polarize each fixed electrode of the capacitors of the sensor at a determined voltage value that is inverse of the voltage value controlled by the first excitation unit, wherein the first and second excitation unit are arranged to operate alternately and cyclically in each measuring cycle, each with their respective integrator unit, so that the electronic circuit operates entirely symmetrically to measure the physical parameter.

3. The electronic circuit according to claim 2, wherein each integrator unit comprises:
   (1) an operational amplifier;
   (2) an integration capacitor connected between an inverter input of the amplifier and the amplifier output;
   (3) a first switch connected between the output of the charge transfer amplifier unit and the inverter input of the amplifier; and
   (4) a second switch connected between the output of the charge transfer amplifier unit and the non-inverter input of the amplifier, wherein the non-inverter input of the amplifier is polarised at a reference voltage, wherein each switch of each integrator unit is controlled and alternately closed in each normal measuring cycle of the electronic circuit;
   wherein the first and second compensation capacitors are connected by a first electrode at the input of the first and second switches of each integrator unit;
   wherein a second electrode of each compensation capacitor is each connected to the output of the respective integrator unit by a third switch, and connected to the reference voltage by a fourth switch, wherein the third and fourth switches of each integrator unit are controlled by the control means; and
   wherein the control means is disposed to open the third and fourth switches, and thus disconnect the compensation capacitors, if the voltage deviation between the output voltage of the first integrator unit and the output voltage of the second integrator unit is above the determined voltage threshold.

4. The electronic circuit according to claim 1, wherein the comparison means is a dynamic comparator.

5. The electronic circuit according to claim 1, wherein the connection node of the threshold and control capacitors is connected to a gate of a first NMOS transistor and to the drain thereof by a fifth switch, the source of the first NMOS transistor being connected to the low potential terminal, wherein the drain of the first NMOS transistor is connected to the drain of a first PMOS transistor, wherein a source of the first PMOS transistor is connected to the high potential terminal, the gate of the first PMOS transistor being polarised by the polarising voltage, wherein the polarising voltage also polarises the gate of a second PMOS transistor, wherein a source of the second PMOS transistor is connected to the high potential terminal, the drain of the second PMOS transistor being connected to the drain of a second NMOS transistor, where a source of the second NMOS transistor is connected to the low potential terminal, and the gate of the second NMOS transistor is connected to the drains of the first NMOS and PMOS transistors, and wherein the drains of the second NMOS and PMOS transistors are connected to an input of a first D flip-flop clocked by a first clock signal and to an input of a second D flip-flop clocked by a second clock signal, the output of each flip-flop being connected to a NOR logic gate, and wherein the output of the NOR logic gate supplies the comparator control signal.

6. A method of activating the electronic circuit according to claim 1, for controlling the level of an output voltage of at least one integrator unit, for measuring a physical parameter, the method including at least two phases for each successive measuring cycle, the method comprising the steps of:
(a) polarising, in a first phase, each fixed electrode of the capacitors of the sensor at the output voltage of the integrator unit via the excitation unit; and
(b) polarising, in a second phase, via the excitation unit, the fixed electrode of the first capacitor at a high voltage or at a low voltage of a supply voltage source of the electronic circuit, and in polarising the fixed electrode of the second capacitor inversely to the fixed electrode of the first capacitor, at a low voltage or at a high voltage of the voltage source;
wherein during successive physical parameter measuring cycles, the activated comparison means compares the output voltage and a comparison voltage and supplies a control signal to disconnect the compensation capacitor if the deviation between the output voltage and the comparison voltage is above a determined voltage threshold, and wherein the compensation capacitor remains disconnected in the subsequent measuring cycles while the voltage deviation remains higher than the voltage threshold.

7. The method according to claim 6, wherein the comparison performed by the comparison means to check whether the deviation between the output voltage and the comparison voltage is higher than the determined voltage threshold lasts for three successive measuring cycles, and wherein the comparison in the comparison means is continually repeated while the voltage deviation remains greater than the voltage threshold.

8. The method according to claim 7, wherein, to perform a comparison cycle, the comparison means performs a first comparison by subtracting the output voltage from the comparison voltage, and a second comparison by subtracting the comparison voltage from the output voltage, and wherein, if the result of at least one of the subtractions is higher than the determined voltage threshold, the control signal supplied by the comparison means disconnects the compensation capacitor.

9. The method according to claim 6, wherein the electronic circuit includes a second integrator unit that has a second compensation capacitor and a second excitation unit, wherein the second compensation capacitor and the second excitation unit have the same structure as the first integrator unit and the first excitation unit, but operate alternately to measure a physical parameter, the method including four phases for each successive physical parameter measuring cycle, wherein, after the first and second phases, the method further comprising the steps of:
(c) polarising, in a third phase, via the second excitation unit, each fixed electrode of the sensor capacitors at the output voltage of the second integrator unit; and
(d) polarising, in a fourth phase, via the second excitation unit, each fixed electrode of the sensor capacitors, with one fixed electrode polarised at the high voltage and the other fixed electrode at the low voltage, inversely to the polarisation of the electrodes in the second phase;
wherein during the physical parameter measuring cycles, the comparison means performs a comparison between the first integrator unit output voltage and the second integrator unit output voltage, as the comparison voltage, for a duration that corresponds to three successive measuring cycles, and wherein, in each comparison cycle, the comparison means performs a first comparison of the first integrator unit output voltage subtracted from the second integrator unit output voltage, and a second comparison of the second integrator unit output voltage subtracted from the first integrator unit output voltage, and if the result of at least one of the subtractions is greater than the determined voltage threshold, a control signal supplied by the comparison means disconnects the two compensation capacitors.

10. An electronic circuit comprising:
(a) a capacitive sensor disposed to measure a physical parameter, wherein the sensor includes at least two differential-mounted capacitors, wherein each differential-mounted capacitor has a fixed electrode, wherein the at least two differential-mounted capacitors share a common electrode that is movable relative to each fixed electrode of the at least two capacitors, and wherein the common electrode is moved to alter the capacitive value of each capacitor during measurement of the physical parameter; and
(b) an interface connected to the capacitive sensor, wherein the interface includes
(i) a charge transfer amplifier unit connected to the common electrode,
(ii) an integrator unit disposed to integrate the charges supplied by the charge transfer amplifier unit and to supply an output voltage, wherein the integrator unit has
(1) a first compensation capacitor at input,
(2) an operational amplifier with an inverter input, a non-inverter input and an output,
(3) an integration capacitor, wherein the integration capacitor is connected between the inverter input and the output of the operational amplifier,
(4) a first switch connected between an output of the charge transfer amplifier unit and the inverter input of the operational amplifier,
(5) a second switch connected between the output of the charge transfer amplifier unit and the non-inverter input of the operational amplifier, wherein the non-inverter input of the operational amplifier is polarised at a reference voltage, wherein each switch of the integrator unit is controlled and alternately closed in each normal measuring cycle of the electronic circuit, and
(iii) an excitation unit arranged between the output of the integrator unit and the sensor, wherein the excitation unit is disposed to polarize each fixed electrode of the sensor capacitors at a determined voltage value, and
(iv) comparison means disposed to compare the output voltage with a comparison voltage and to control disconnection of the compensation capacitor at the integrator unit input, if the deviation between the output voltage and the comparison voltage is above a determined voltage threshold;
wherein the compensation capacitor is connected by a first electrode at an input of the first and second switches of the integrator unit; and
wherein the compensation capacitor has a second electrode that is connected to an output of the integrator unit by a third switch and to the reference voltage by a fourth switch, wherein the third and fourth switches of the integrator unit are controlled by a control means, and wherein the control means opens the third and fourth switches, thereby disconnecting the compensation capacitor, if the voltage deviation between an output voltage of the integrator unit and a comparison voltage is above the determined voltage threshold.

11. An electronic circuit comprising: (a) a capacitive sensor disposed to measure a physical parameter, wherein the sensor includes at least two differential-mounted capacitors, wherein each differential-mounted capacitor has a fixed electrode, wherein the at least two differential-mounted capacitors share a common electrode that is movable relative to each fixed electrode of the at least two capacitors, and wherein the common electrode is moved to alter the capacitive value of each capacitor during measurement of the physical parameter; and (b) an interface connected to the capacitive sensor, wherein the interface includes (i) a charge transfer amplifier unit connected to the common electrode,
(ii) an integrator unit disposed to integrate the charges supplied by the charge transfer amplifier unit and to supply an output voltage, wherein the integrator unit includes a first compensation capacitor at input, and
(iii) an excitation unit arranged between the output of the integrator unit and the sensor, wherein the excitation unit is disposed to polarize each fixed electrode of the sensor capacitors at a determined voltage value, and
(iv) comparison means disposed to compare the output voltage with a comparison voltage and to control disconnection of the compensation capacitor at the integrator unit input if the deviation between the output voltage and the comparison voltage is above a determined voltage threshold;

wherein each integrator unit comprises:
(1) an operational amplifier;
(2) an integration capacitor connected between an inverter input of the amplifier and the amplifier output;
(3) a first switch connected between the output of the charge transfer amplifier unit and the inverter input of the amplifier; and
(4) a second switch connected between the output of the charge transfer amplifier unit and the non-inverter input of the amplifier, wherein the non-inverter input of the amplifier is polarised at a reference voltage, wherein each switch of each integrator unit is controlled and alternately closed in each normal measuring cycle of the electronic circuit;

wherein the first and second compensation capacitors are connected by a first electrode at the input of the first and second switches of each integrator unit; wherein a second electrode of each compensation capacitor is connected to the output of the respective integrator unit by a third switch, and connected to the reference voltage by a fourth switch, wherein the third and fourth switches of each integrator unit are controlled by the control means;

and wherein the control means is disposed to open the third and fourth switches, and thus disconnect the compensation capacitors, if the voltage deviation between the output voltage of the first integrator unit and the output voltage of the second integrator unit is above the determined voltage threshold.

* * * * *